Mar. 3, 1925. 1,528,594
A. ARTRIP
AUTOMATIC CUT-OFF FOR GAS CONDUCTORS
Filed Sept. 17, 1924 3 Sheets-Sheet 3
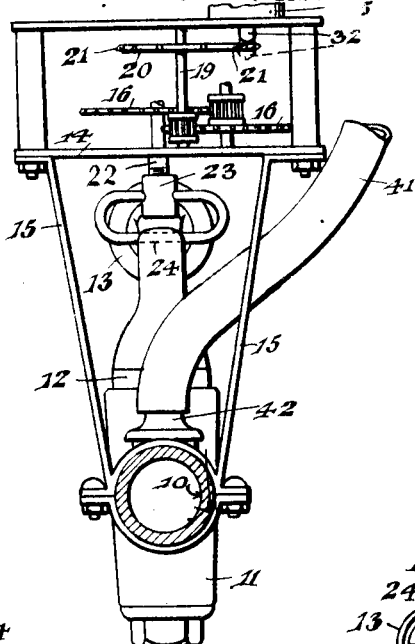
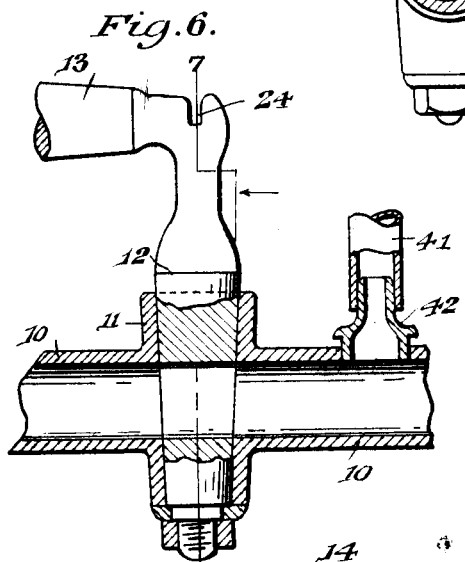
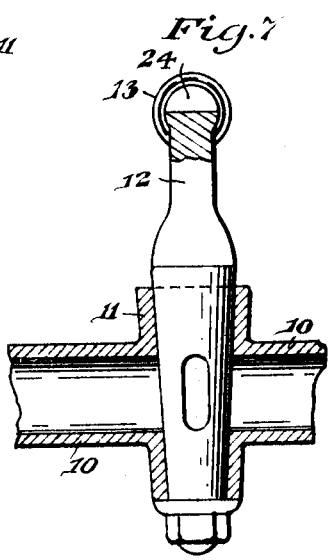
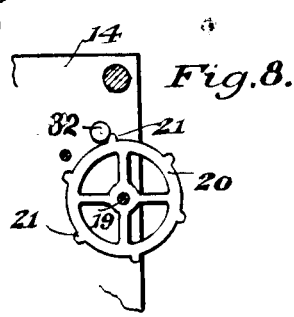
INVENTOR.
*Alva Artrip,*
BY
*Geo. P. Kimmel* ATTORNEY.

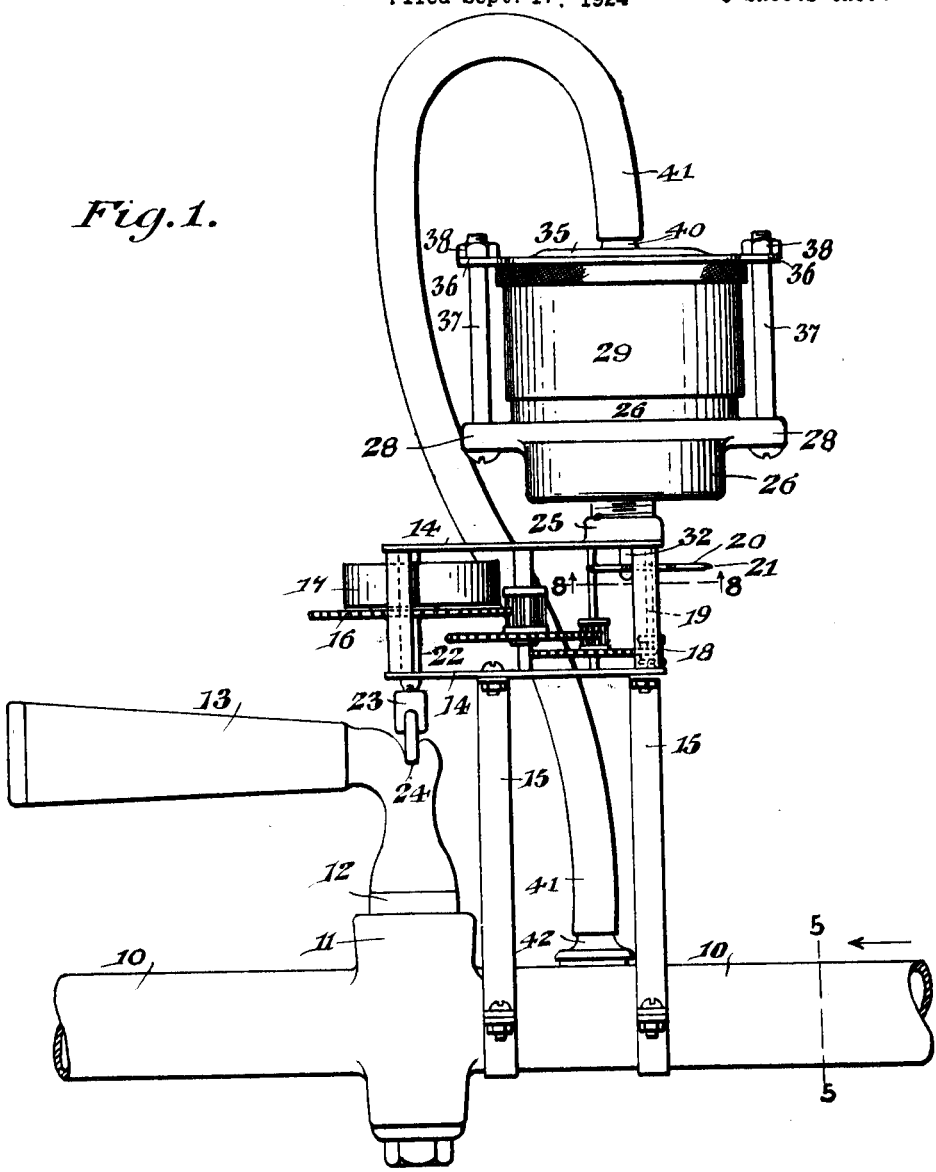

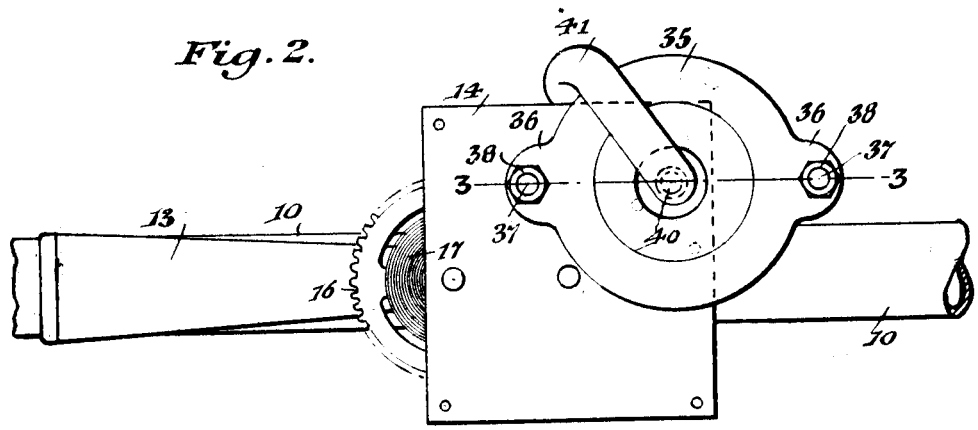
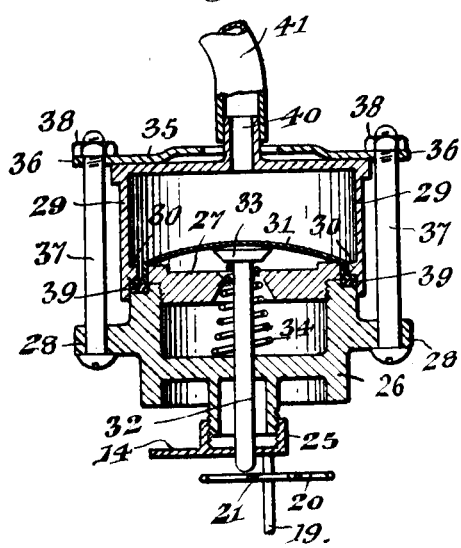
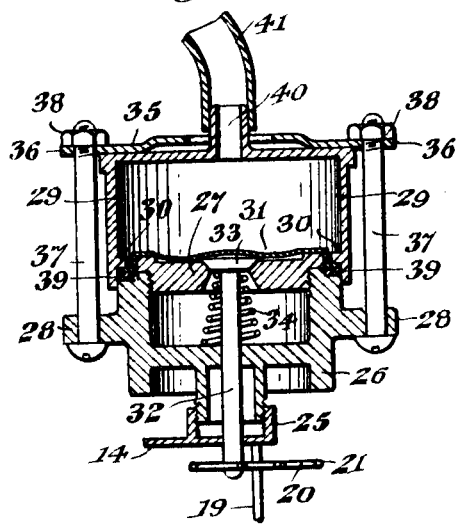

Patented Mar. 3, 1925.

1,528,594

UNITED STATES PATENT OFFICE.

ALVA ARTRIP, OF TOLER, KENTUCKY.

AUTOMATIC CUT-OFF FOR GAS CONDUCTORS.

Application filed September 17, 1924. Serial No. 738,318.

*To all whom it may concern:*

Be it known that I, ALVA ARTRIP, a citizen of the United States, residing at Toler, in the county of Pike and State of Kentucky, have invented certain new and useful Improvements in Automatic Cut-Offs for Gas Conductors, of which the following is a specification.

This invention relates to automatic cut off devices for gas conductors, and has for one of its objects to provide a simply constructed apparatus adapted to be connected in a gas conductor and operative to automatically close a valve therein and cut off the flow in event of the interruption of the normal flow of gas or the reduction of the pressure below a pre-determined or safety degree.

With these and other objects in view the invention consists in certain novel features of construction as hereinafter shown and described and then specifically pointed out in the claims, and in the drawings illustrative of the preferred embodiment of the invention.

Figure 1 is a side elevation of the improved apparatus applied to a section of a gas main together with a conventional controlling valve, and Figure 2 is a plan view of the same.

Figure 3 is a section on the line 3—3 of Figure 2, showing the position of the parts when the gas pressure is off, and Figure 4 is a like view showing the position of the parts when the gas pressure is on.

Figure 5 is an end elevation of part of the device with the gas conductor in section on the line 5—5 of Figure 1.

Figure 6 is a sectional detail of the controlling valve.

Figure 7 is a section on the line 7—7 of Figure 6.

Figure 8 is a detail illustrating the construction and operation of the stop pin and stop wheel.

In the operation of gas supply devices, especially for residences, factories or the like, the supply conductors are led into the building from under ground mains, and are supplied with a main controlling valve, generally in the cellar or basement of the building and between the meter and the street main, the burners or like devices being supplied by suitable smaller conductors from the main or larger conductors.

While the flow from the main conductor and the pressure therein is normal, the burners and the like which are in use or lighted likewise operate normally, but in event of any abnormal lessening of the pressure from any cause, or a breakage or abnormal leakage from the main conductor, the burners will be extinguished, and unless the controlling valve be closed, or all the burners and the like shut off, the unlighted gas will flow therefrom when the flow of gas through the main is resumed.

To automatically cut off the flow from the main conductor to the system of conductors leading to the burners and the like, and thus obviate the danger of the escape of gas through the open unlighted burners when the interrupted flow is resumed, is the object of the present invention, and in its preferred form is illustrated in the drawings forming a part of this application.

In the drawings thus employed the main conductor is indicated at 10 and the main controlling valve connected into the main conductor incuding a shell or body 11, an apertured plug at 12 and an operating handle at 13, of the usual construction.

The improved automatically operative device includes a supporting frame represented as a whole at 14 and coupled in any suitable manner, for instance by standards 15, to the main conductor 10. Mounted within the frame members 14 is a clock work device including a train of gears 16 and coiled spring 17, the train of gears terminating in a pinion 18 and shaft 19, the latter carrying a wheel 20 having spaced radial lugs or stops 21.

One of the shafts 22 of the train of gears 16 is extended downwardly and terminates in a coupling key 23 which engages in a seat 24 in the plug 12.

Mounted at 25 on the frame 14 is a lower shell or body 26 having a detachable closure 27 and lateral perforated ears 28.

Bearing over the lower shell or body 26 is an upper shell or body member 29, overlapping the member 26 and with an internal stop rib 30 bearing upon the upper edge of the member 26.

Bearing upon the upper edge of the member 26 and beneath the rib 30 by its outer edge, is a flexible diaphragm 31.

The detachable closure 27 is apertured to receive a pin 32 having a laterally extended head 33 bearing beneath the diaphragm 31, the pin being surrounded by a spring 34 operating to press the head 33 of the pin against the diaphragm 31. At its lower end the pin 32 extends through the coupling 25 and into the path of the lugs 21 on the wheel 20.

Bearing upon the upper face of the upper shell or hood 29 is a holding plate 35 having lateral perforated ears 36 in alinement with the ears 28 of the lower shell member 26, the alined ears to receive clamp bolts 37 having clamp nuts 38, whereby the upper shell 29 is firmly clamped upon the lower shell and likewise clamp the diaphragm gas tight in position.

The diaphragm 31, it will be noted is provided with a suitable packing ring 39.

The upper shell 29 is provided with a nipple member 40 to receive one end of a conductor 41, the opposite end of the conductor being coupled to a nipple device 42 connected into the main 10 between the street main or other source of supply and the controlling valve. By this arrangement it will be obvious that so long as the normal pressure of gas is present in the main 10, the same pressure will be present in the upper shell 29 and exert its influence upon the diaphragm 31 and compress it against the pin 32, 33, and maintain the lower end of the pin in the path of the studs 21 of the wheel 20 and thus hold the spring 17 quiescent or non-operative.

It will be understood that the spring 17 is initially wound up, and thus exerts its force upon the plug 12 to move the latter toward closed position, or with the handle 13 at right angles to the axial line of the conductor 10.

When the pressure is normal in the main conductor 10, the corresponding pressure in the auxiliary 41, will depress the pin 32 into the path of the studs 21 on the wheel 20, and when the handle 13 is moved to dispose the plug 12 in open position against the resistance of the spring 17, the depression of the pin 32 into the path of the studs 21, will hold the wheel 20 stationary and likewise hold the spring quiescent through the train of gears, and thus prevent it from rotating the plug 12 into closed position, and this non-effective position of the spring 17 will be maintained so long as the normal pressure is maintained against the diaphragm 31 to hold the pin in its lower position, in the path of the studs 21.

If however the pressure in the main 10 and shell member 29 be reduced below a safety point, or sufficient to cause the burners to be extinguished, the small spring 34 will be released and elevate the pin 32 and thus release the wheel 20, and the train of gears 16, and permit the larger spring 17 to automatically close the controlling valve, and shut off the flow to the burners.

Thus all danger of gas flowing to the unlighted open burners when the pressure is resumed, is obviated.

The device is simple in construction, can be manufactured of any required size or of any suitable material, and operates effectually for the purpose described.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described my invention what I claim is:

1. A device of the class described, comprising a frame, a spring supported in said frame and adapted to hold the valve of a gas conductor in open position, an enclosed shell, a flexible diaphragm within said shell, conductor means coupled at one end to said shell and adapted to be coupled at the other end of said gas conductor between the valve and the source of supply, a train of gears operative by said spring and including a toothed disk, a pin engageable by said diaphragm and extending into the paths of the teeth of said disk when gas pressure is applied to said diaphragm and operative to hold the spring strained and maintain the valve open.

2. The combination with a gas supply main having a controlling valve therein, of a spring operative to hold said valve open, an enclosed shell, a flexible diaphragm within said shell, a conductor connected at one end into said shell and at the other end into said gas main between the valve and the source of supply, a train of gears operative by said spring and including a toothed disk, a pin engageable by said diaphragm and extending into the paths of the teeth of said disk when gas pressure is applied to said diaphragm and operative to hold the spring strained and maintain the valve open.

3. In a device of the class described, a shell including a base portion, an upper portion bearing over the base portion and having a stop rib bearing on the same, a closure for the base portion, a diaphragm element supported on the closure with its margin between the stop rib and the base portion, means for clamping the upper shell portion upon the base shell portion, a pin leading through the base and closure portions in position to be influenced by the diaphragm, a conductor element connected into the upper shell portion and adapted to be connected into a gas supply main, a spring adapted to hold a controlling valve in said gas supply main in open position, and means operative by said pin when the diaphragm is depressed, to hold said spring under strain.

In testimony whereof, I affix my signature hereto.

ALVA ARTRIP